US012231349B2

(12) United States Patent
O'Connor et al.

(10) Patent No.: US 12,231,349 B2
(45) Date of Patent: *Feb. 18, 2025

(54) MANAGING CLOUD ACQUISITIONS USING DISTRIBUTED LEDGERS

(71) Applicant: Red Hat, Inc., Raleigh, NC (US)

(72) Inventors: Cathal O'Connor, Waterford (IL); Brian Gallagher, Waterford (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,683

(22) Filed: Jun. 21, 2023

(65) Prior Publication Data

US 2023/0336499 A1 Oct. 19, 2023

Related U.S. Application Data

(63) Continuation of application No. 17/592,851, filed on Feb. 4, 2022, now Pat. No. 11,706,155.

(51) Int. Cl.
*H04L 47/762* (2022.01)
*H04L 9/32* (2006.01)
*H04L 47/70* (2022.01)
*H04L 47/78* (2022.01)

(52) U.S. Cl.
CPC .......... *H04L 47/762* (2013.01); *H04L 9/3236* (2013.01); *H04L 9/3247* (2013.01); *H04L 47/781* (2013.01); *H04L 47/822* (2013.01); *H04L 47/828* (2013.01)

(58) Field of Classification Search
CPC ... H04L 47/762; H04L 9/3236; H04L 9/3247; H04L 47/781; H04L 47/822; H04L 47/828
See application file for complete search history.

(56) References Cited

U.S. PATENT DOCUMENTS

| | | | |
|---|---|---|---|
| 8,244,559 B2 * | 8/2012 | Horvitz | G06F 9/5027 |
| | | | 705/30 |
| 10,686,799 B2 | 6/2020 | Kelly | |
| 10,694,032 B2 * | 6/2020 | Byrne | G06Q 20/382 |
| 11,063,745 B1 * | 7/2021 | Du | H04L 9/0825 |

(Continued)

OTHER PUBLICATIONS

Nguyen et al., "Integration of Blockchain and Cloud of Things: Architecture, Applications and Challenges", Student Member, Senior Member; IEEE, Aug. 28, 2020, 29 pages https://arxiv.org/pdf/1908.09058.pdf.

(Continued)

*Primary Examiner* — Douglas B Blair
(74) *Attorney, Agent, or Firm* — Womble Bond Dickinson (US) LLP (57) ABSTRACT

Systems and methods of the disclosure include: broadcasting, by a cloud resource provisioning component, to a cryptographically-protected distributed ledger, a first transaction comprising a cloud resource request for provisioning a cloud resource; transmitting, to one or more cloud providers, the cloud resource request; receiving, from a first cloud provider of the one or more cloud providers, a first cloud resource offer responsive to the cloud resource request; and broadcasting, to the cryptographically-protected distributed ledger, a second transaction comprising the first cloud resource offer.

20 Claims, 6 Drawing Sheets

(56) References Cited

U.S. PATENT DOCUMENTS

| | | | |
|---|---|---|---|
| 11,128,437 B1* | 9/2021 | Nossik | H04L 9/0637 |
| 11,558,392 B2 | 1/2023 | Lee | |
| 11,641,579 B1* | 5/2023 | Mukherjee | H04W 48/18 |
| | | | 370/329 |
| 11,706,155 B1* | 7/2023 | O'Connor | H04L 47/762 |
| | | | 709/226 |
| 2013/0031028 A1 | 1/2013 | Martin | |
| 2017/0109815 A1 | 4/2017 | Bai | |
| 2018/0060106 A1 | 3/2018 | Madtha | |
| 2018/0060894 A1 | 3/2018 | Beveridge | |
| 2018/0062928 A1 | 3/2018 | Beveridge | |
| 2018/0063021 A1 | 3/2018 | Beveridge | |
| 2018/0063026 A1 | 3/2018 | Beveridge | |
| 2018/0063235 A1 | 3/2018 | Beveridge | |
| 2018/0095997 A1 | 4/2018 | Beveridge | |
| 2018/0260251 A1 | 9/2018 | Beveridge | |
| 2019/0058709 A1* | 2/2019 | Kempf | G06F 21/64 |
| 2019/0334726 A1* | 10/2019 | Kelly | H04L 9/3247 |
| 2020/0019865 A1* | 1/2020 | Wang | H04L 9/50 |
| 2020/0076884 A1* | 3/2020 | Li | H04L 9/0637 |
| 2020/0136843 A1 | 4/2020 | Chalakudi | |
| 2020/0334773 A1* | 10/2020 | Spangenberg | G06Q 50/184 |
| 2020/0394654 A1 | 12/2020 | Concannon | |
| 2020/0401578 A1 | 12/2020 | Shi | |
| 2021/0281428 A1 | 9/2021 | Kempf | |
| 2021/0288918 A1* | 9/2021 | Sciancalepore | G06Q 10/00 |
| 2021/0409409 A1* | 12/2021 | Palanisamy | H04L 63/10 |
| 2022/0358185 A1* | 11/2022 | Newman | G06F 16/282 |
| 2023/0013119 A1* | 1/2023 | Gaur | G06Q 20/02 |

OTHER PUBLICATIONS

"Amazon Managed Blockchain", Amazon Web Services, Inc., 2021, 14 pages https://aws.amazon.com/managed-blockchain/.

* cited by examiner

MANAGING CLOUD ACQUISITIONS USING DISTRIBUTED LEDGERS

RELATED APPLICATIONS

The present application is a continuation of application Ser. No. 17/592,851, filed Feb. 4, 2022, entitled "Managing Cloud Acquisitions Using Distributed Ledgers," which is incorporated by reference herein.

TECHNICAL FIELD

The implementations of the disclosure generally relate to computer systems and, more specifically, to managing cloud acquisitions using distributed ledgers.

BACKGROUND

Cloud services are widely used in various computer systems, including in the managed services context. A vendor offering managed services typically supports multiple cloud providers and often chooses a cloud provider on behalf of a customer. The customer provides the vendor with a set of requirements, including technical, legal, and compliance/regulatory requirements, so that the vendor can pick the cloud provider that best meets those requirements at the best price. Picking a provider that best meets the customer's requirements at the best price can often depend on the vendor's relationships with various cloud providers and can thus involve some vendor bias that is not in the customer's best interest. This can impact the integrity, organization, and transparency of selecting cloud providers and ultimately lead to distrust between a vendor and customer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for managing cloud acquisitions using distributed ledgers.

Customers often rely on managed services (e.g., cloud services) for their businesses. Typically, customers work with vendors in order to select a cloud provider to support the managed services being offered. Customers will provide a vendor with a set of requirements, including technical, legal, and compliance/regulatory requirements. The vendor will then communicate the customer's requirements to multiple cloud providers, utilizing their vendor relationships and specialist knowledge in order to negotiate and pick the cloud provider that best meets those requirements at the best price. Customers are thus not typically involved in the process of selecting the cloud provider beyond providing the particular requirements. As such, vendors can oftentimes act in their own self-interest when choosing a cloud provider for a customer. This can impact the integrity, organization, and transparency of selecting cloud providers and ultimately lead to distrust between a vendor and customer. Further, there can be a lack of automation in matching cloud provider/cloud provider offers to a cloud resource request due to vendors manually selecting cloud providers.

Aspects of the present disclosure address the above and other deficiencies by providing systems and methods for managing cloud resource provisioning using cryptographically-secured distributed ledgers. A "distributed ledger" is a decentralized database that is spread across multiple (also geographically dispersed) sites. The distributed ledger eliminates the need for a central authentication authority by transferring authority and trust to a virtual network of nodes in a cloud-based system. Each node can sequentially record transactions in a public "block" (e.g., a data structure) of data by creating a unique "chain" also referred to as a blockchain. Each block can contain information associated with a particular electronic (e.g., online) transaction. A transaction generally reflects an update to data maintained on the distributed ledger.

A "blockchain" is one type of distributed ledger. The blockchain is a data structure comprising a complete history of each block in the network from the first block to the most recently added block. Blocks of the blockchain behave like containers with data (e.g., transactions) in blocks that are connected to other blocks in the blockchain. The blocks are "immutable" in that they cannot be changed. Each node of the network maintains a copy of the blockchain upon joining the network. Blocks of data are then processed by each node or otherwise added to the blockchain in a linear order. When the nodes are processing the blocks, the nodes link each block of data to a previous block in their copy of the blockchain, using a cryptographic fingerprint, such as a hash function.

To link the blocks, each node generates a cryptographic fingerprint by using a hash function that turns the block's data into a fingerprint of that data (also referred to as a hash value). A hash value is an output string of data generated by using a hash function to an input string of data. Although the input string can be arbitrarily large, the output hash value can be set to a fixed size in accordance with the hash function used. The nodes then successively build blocks that include a reference (e.g., a data pointer) to the hash value of the previous block in the blockchain. As such, the blocks of the blockchain are explicitly ordered by reference for the previous block's hash value, which reflects the content of that previous block. The hash values are used to secure (by cryptography) the authentication of the block data and the source associated with each block in the blockchain, which removes the need for a central authentication authority. Each hash value can be generated based on the input (i.e., the block data). More specifically, a one-way function that produces the same output for a given input can be employed to generate each hash value. A one-way function is a function that, from a computational complexity perspective, is "easy" to obtain an output for a given input, but "hard" to invert the output to identify the given input. This provides security against potential tampering with the blockchain.

Blocks are stored one after the other in the blockchain, but each block can only be added when all of the nodes reach a quorum (consensus) regarding rules about what new blocks can be added. To reach the quorum, the nodes of the network may transmit messages between each other regarding transactions for new block additions that are happening to one another. For example, various consensus schemes can be employed, such as proof-of-work or proof-of-stake methods.

Proof-of-work methods can incentivize participation in consensus by providing a reward for successfully performing consensus tasks. One example of a proof-of-work method is referred to as "mining" (e.g., in Bitcoin). Generally, mining involves attempting to discover a nonce (number used once) value to add to a block corresponding to a transaction to be added to the blockchain. The nonce affects the hash value calculated for a block. Nodes performing the consensus process, referred to as "miners," can agree upon some pattern that should appear in the hash value of the block plus nonce data, and can iterate through a series of random numbers for the nonce until the pattern appears in the hash value (e.g., the pattern can be that the hash value begins with a sequence of six zeroes). Once a nonce value is discovered that can generate the pattern, the nonce value is provided to the other miners to confirm the validity of the nonce value. Once a threshold number of nodes agrees that the nonce value is valid (e.g., a majority of nodes), then consensus is reached and the data can be written to the blockchain. The miner who discovered the nonce value can be provided with a monetary reward (e.g., digital currency).

Proof-of-stake methods can incentivize participation in consensus by employing a stake approach. Here, users can stake credits for the right to validate transactions (e.g., by depositing digital currency into a central wallet), and transaction validation (e.g., mining) power for a user is a function of the amount of credits that have been staked. A user's percentage of the total amount of credits staked can correspond to a percentage of blocks that the user can validate. For example, if a user owns 10% of the total staked credits, the user can validate 10% of the total number of blocks (e.g., a 10% chance to perform the block validation).

In some implementations of the present disclosure, a distributed ledger can be employed to store a cloud resource request, store cloud resource offers responsive to the request, and store a smart contract to match offers to the request and/or select from multiple offers. A cloud resource provisioning component of a cloud management system can receive a cloud resource request from a cloud client via a cloud provisioning request application programming interface (API). In response to receiving the request, the cloud resource provisioning component can store the request on the distributed ledger. Storing the request can involve building a transaction reflecting the request (i.e., the transaction stores data relating to the request) and broadcasting the transaction over a network connecting the cloud management system and the distributed ledger. The transaction data can include relevant data relating to the request, including an identifier of the cloud client that has initiated the request, a timestamp associated with the request, one or more parameters of the computing resource(s) requested (e.g., parameters characterizing compute nodes, storage, networking, as well as compliance requirements, regulatory requirements, legal requirements, pricing requirements, etc.). In some embodiments, storing the request can include building and broadcasting a transaction that includes a smart contract code. The smart contract code can be a computer program containing a set of rules under which to match offers from cloud providers to the request from the cloud client (i.e., the set of rules specified in the smart contract can be used to validate cloud resource offers in response to the cloud resource request).

In some implementations, multiple blockchain clients (i.e., a node of the distributed ledger) can listen for transactions broadcasted over the network. If a transaction is broadcasted over the network, one or more blockchain clients can retrieve data associated with the transaction. Responsive to retrieving the transaction data, a blockchain client can validate the transaction data. Validating the transaction data can involve applying a set of validation rules to the transaction. Once the blockchain client validates the transaction data, the blockchain client can add the transaction data to a current block (e.g., the block that is being assembled based on incoming transaction data). Responsive to determining that the block has reached a predefined size, the blockchain client can broadcast the block on the network to other nodes of the distributed ledger. The blockchain client can further add the block to a local copy of the blockchain stored in a local storage of the blockchain client.

In response to receiving the request, the cloud resource provisioning component can transmit the request to one or more cloud providers. Responsive to transmitting the request to the one or more cloud providers, the cloud resource provisioning component can receive a cloud resource offer from a cloud provider. The cloud resource offer can include one or more cloud resource parameters, e.g., computing, storage, networking, compliance, regulatory, legal, pricing, etc. The cloud resource provisioning component can broadcast a transaction reflecting the cloud resource offer over the network connecting the computer system and the distributed ledger. The transaction data can include the cloud resource offer, including identification of the cloud provider and the one or more cloud resource parameters.

In some implementations, the smart contract code associated with the request can be used to implement validation of the cloud resource offer received from the cloud provider. The cloud management system can generate the smart contract based, e.g., on the parameters specified by the cloud resource request and/or additional parameters, such as client-specific requirements. Generating the smart contract can include filling in the parameter values to a contract template. The contract template can be selected by the cloud management system based on the parameters specified by the cloud resource request and/or client-specific requirements. Validating the cloud resource offer using the smart contract code can include comparing a cloud resource parameter specified by the request to a cloud resource parameter specified by the cloud resource offer. For example, the smart contract can compare the computing parameter specified by the request to the computing parameter specified by the cloud resource offer. If the computing parameter specified by the cloud resource offer is greater than or equal to the computing parameter specified by the request, the blockchain client can validate the cloud resource offer. In some embodiments, validating the cloud resource offer can include the smart contract selecting, among multiple qualified cloud resource offers (e.g., cloud resource offers that satisfy one or more cloud resource parameters specified by the request), a cloud resource that specifies a minimal pricing (e.g., the cloud resource offer specifying the lowest price). In some embodiments, validating the cloud resource offer can include the smart contract accepting an electronic signature of the one or more parties from which the request was received. In some embodiments, validating the cloud resource offer can include the smart contract rejecting a cloud resource offer that was received upon the expiration of a predefined period of time. The predefined period of time can be triggered by the request.

In some implementations, the cloud resource provisioning component can receive, from the smart contract that is being executed on the blockchain client of the distributed ledger (i.e., a node of the distributed ledger), a notification (e.g., message) that reflects the validation result of the cloud resource offer in response to the cloud resource request. In some implementations, receiving the notification can include the cloud resource provisioning component listening for blocks being broadcasted over the network. In some implementations, the cloud resource provisioning component can listen for a block storing transaction data relating to the validation of the cloud resource offer. Responsive to listening for the block storing transaction data, the cloud resource provisioning component can cause the cloud provider that sent the validated cloud resource offer to provision one or more cloud resources as specified by the cloud resource offer. In some implementations, the cloud resource provisioning component can identify the cloud provider based on the identification of the cloud provider as stored in the transaction data. In some implementations, the cloud resource provisioning component can create a message to send to the cloud provider. The message can include the validation/selection of the cloud provider and details regarding the request (e.g., the specified cloud resource parameters). The message can be sent over a secured communication channel from the cloud resource provisioning component to the cloud provider. The secured communication channel can be a VPN channel, an SSH channel, a TLS channel, or any similar secured communication channel. Upon receiving the message, the cloud provider can provision one or more cloud resources based on cloud resource offer to the one or more parties from which the request was received (e.g., the customer).

In some implementations, the cloud resource provisioning component can build another transaction reflecting the provisioning data from the cloud provider and broadcast the transaction (i.e., data including the provisioning data) over the network. In some implementations, the multiple blockchain clients can listen for the transaction broadcasted over the network. A blockchain client can then retrieve the data associated with the transaction. Responsive to retrieving the transaction data, the blockchain client can validate the transaction data. Responsive to validating the transaction data, the blockchain client can add the transaction data to a current block (e.g., the block that is being assembled based on incoming transaction data). Responsive to determining that the block has reached a predefined size, the blockchain client can broadcast the block on the network to other nodes of the distributed ledger. The blockchain client can further add the block to a local copy of the blockchain stored in a local storage of the blockchain client.

Thus, a distributed ledger can be used to record each aspect of selecting a cloud provider for provisioning resources in a computer system. By maintaining a record of each transaction on a distributed ledger, implementations of the present disclosure can create a competitive marketplace between cloud providers where parties (e.g., customers) can receive the best offer based on their provided cloud resource parameters. Further, there can be a significant improvement in the level of governance and control of cloud provider selection by preventing certain parties (e.g., vendors) from selecting cloud providers for customers without approval and/or satisfaction of a specified time limit and/or specified cloud resource parameters. Furthermore, implementations of the present disclosure can significantly improve the level of transparency to customers by maintaining a record of each transaction involved in selecting cloud providers, thus improving trust between a vendor and its customer. Additionally, implementations of the present disclosure can aid in providing a tamper-proof audit trail since each aspect of selecting a cloud provider is recorded using the distributed ledger. There can also be a significant improvement in efficiency by automating the selection and provisioning of cloud resources.

Various aspects of the above referenced methods and systems are described in details herein below by way of examples, rather than by way of limitation.

Figure 1:
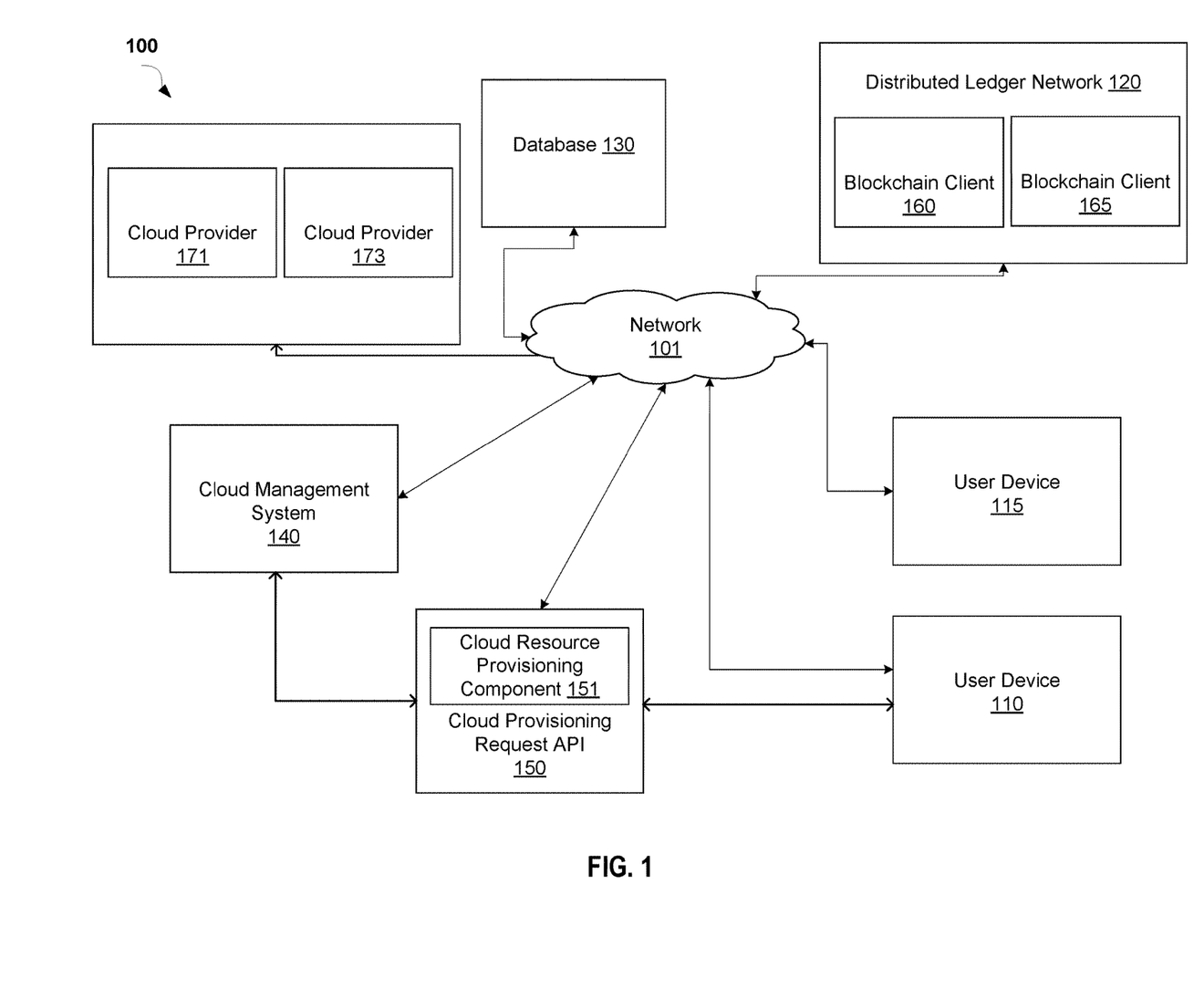
FIG. 1 depicts a block diagram of a network architecture 100 in accordance with one or more aspects of the present disclosure.

FIG. 1 depicts a block diagram of a network architecture 100 in which implementations of the disclosure may operate. Although implementations of the disclosure are described in accordance with a certain type of system, this should not be considered as limiting the scope or usefulness of the features of the disclosure. In some implementations, the network architecture 100 may be used in a Platform-as-a-Service (PaaS) system, such as OpenShift®. The PaaS system provides resources and services for the development and execution of applications owned or managed by multiple users. A PaaS system provides a platform and environment that allow users to build applications and services in a clustered computing environment ("the cloud").

As shown in FIG. 1, the network architecture 100 includes a distributed ledger 120 communicably coupled to user devices, such as a user device 110 and a user device 115, a database 130, a cloud management system 140, a set of cloud providers 171, 173, a cloud provisioning request application programming interface (API) 150, and a cloud resource provisioning component 151 via a network 101. Network 101 may be a private network (e.g., a local area network (LAN), a wide area network (WAN), intranet, or other similar private networks) or a public network (e.g., the Internet). The distributed ledger 120 may include one or more blockchain clients 160, 165 across one or more machines such as server computers, desktop computers, or any other computing device. Each blockchain client 160, 165 may store data (i.e., transaction data) locally in each blockchain client's local storage. Each blockchain client 160, 165 is a node of the distributed ledger.

The user devices 110 and 115 may be personal computers (PC), laptops, mobile phones, tablet computers, or any other computing devices. The user devices 110 and 115 may run an operating system (OS) that manages hardware and software of the user devices 110 and 115. An application or a daemon (not shown) may run on the user devices 110 and 115 (e.g., on the OS of each user device).

The database 130 may be implemented on one or more machines, such as server computers, desktop computers, or any other computing device. An example of the database 130 is a persistent storage that is capable of storing data that is collected from various data sources including local and remote computing devices such as desktop computers, laptop computers, handheld computers, server computers, gateway computers, mobile communications devices, cell phones, smart phones, or similar computing device. In some embodiments, the database 130 might be a network-attached file server, while in other embodiments the database 130 might be some other type of persistent storage such as an object-oriented database, a relational database, and so forth.

The database 130 may be coupled to the cloud resource provisioning component 151 directly or via a network. In an example, the database 130 can be a relational database management system (RDBMS) used for the storage of information for cloud providers. In an example, the database 130 can include processing logic to enable the cloud resource provisioning component 151 to search for and retrieve data relating to cloud providers, including cloud resource parameters, as described in more detail herein above.

The blockchain clients 160, 165, of examples of the disclosure, can listen for transaction data relating to cloud providers, such as a request for a cloud provider and one or more offers from one or more cloud providers. Such transaction data can be broadcasted over the network 101 by the cloud resource provisioning component 151. The cloud resource provisioning component 151 can receive such data from monitoring the cloud management system 140 and/or from the user devices 110 and 115 and/or from the cloud providers 171, 173. The blockchain clients 160, 165 can retrieve the transaction data broadcasted over the network 101 and validate the transaction data, as described herein below. The blockchain clients can further add the transaction data to a block of the distributed ledger 120, as described herein above.

Figure 2:
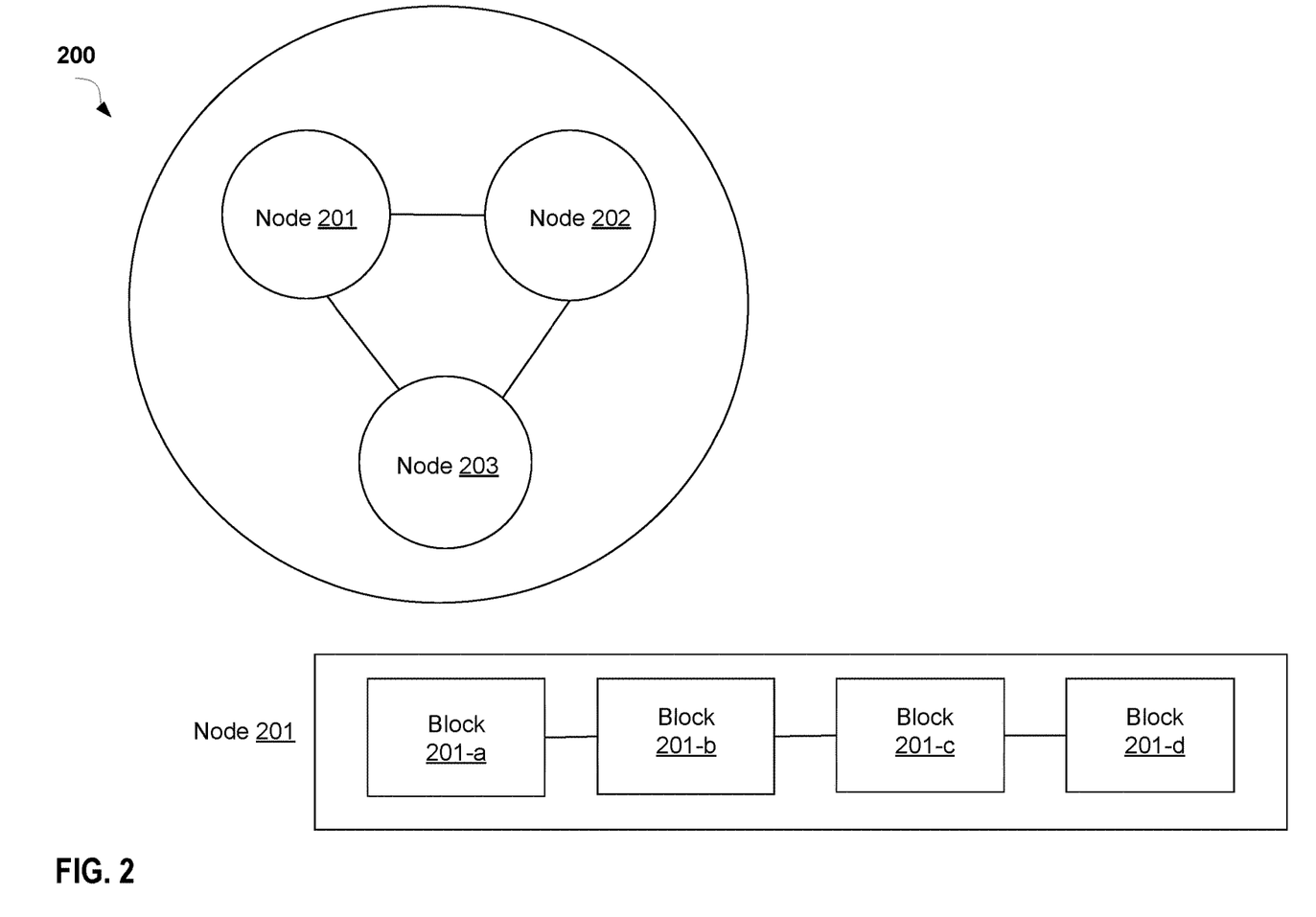
FIG. 2 illustrates an example distributed ledger in accordance with some implementations of the present disclosure.

FIG. 2 is an example of a distributed ledger 200 in accordance with one or more aspects of the present disclosure. In some implementations, the distributed ledger 200 can be a blockchain. A blockchain is a type of distributed ledger that is used, for example, in a Bitcoin crypto-currency system. The blockchain is a data structure comprising a complete history of each block in the distributed ledger 200 from the first block to the most recently added block. Each node, such as node 201 (e.g., blockchain client 160 of FIG. 1), 202, and 203 as illustrated in FIG. 2, keeps a copy of all or a portion of the blockchain (e.g., the distributed ledger 200) in storage (e.g., on disk or in RAM) that is local to that node. For example, each node 201, 202, and 203 can receive a copy of the distributed ledger 200 upon joining the network.

The distributed ledger 200 can be a public ledger that includes many different individual computer systems that are operated by different entities that maintain a single blockchain. In alternative implementations, the distributed ledger 200 can include one or more individual computer systems that are all operated by a single entity (e.g., a private or closed system).

The nodes 201, 202, and 203 can sequentially record data (e.g., transactions) into the distributed ledger 200 as blocks of data. For example, each of the nodes 201, 202, and 203 operated to "process" blocks (e.g., blocks 201-*a*, 201-*b*, 201-*c*, and 201-*d*) of the ledger by validating data (e.g., transactions) associated with each block. Generally, only one of the nodes needs to receive the data that has been broadcasted over a network by a cloud resource provisioning component, such as the cloud resource provisioning component 151 of FIG. 1. Once one node receives the data, it may propagate that data to other participating nodes within the distributed ledger 200 so that it can be added to their copy of the distributed ledger.

To validate a new block that is to be consumed (e.g., added) into the distributed ledger 200, the nodes 201, 202, and 203 can perform a hash operation that includes solving a computationally difficult problem that is also easy to verify. For example, each node may attempt to compute a hash value for a block of data using a cryptographic hash function. The input to the hash function may include the data associated with a block, and the output can be a hash value that represents the data (e.g., transactions) of the block. The nodes 202, 202, and 203 can then successively build blocks that include a reference (e.g., a data pointer) to the hash value of the previous block in the distributed ledger 200. As such, the blocks of the distributed ledger 200 are explicitly ordered by reference to the previous block's hash value, which reflects the content of that previous block.

Figure 3:
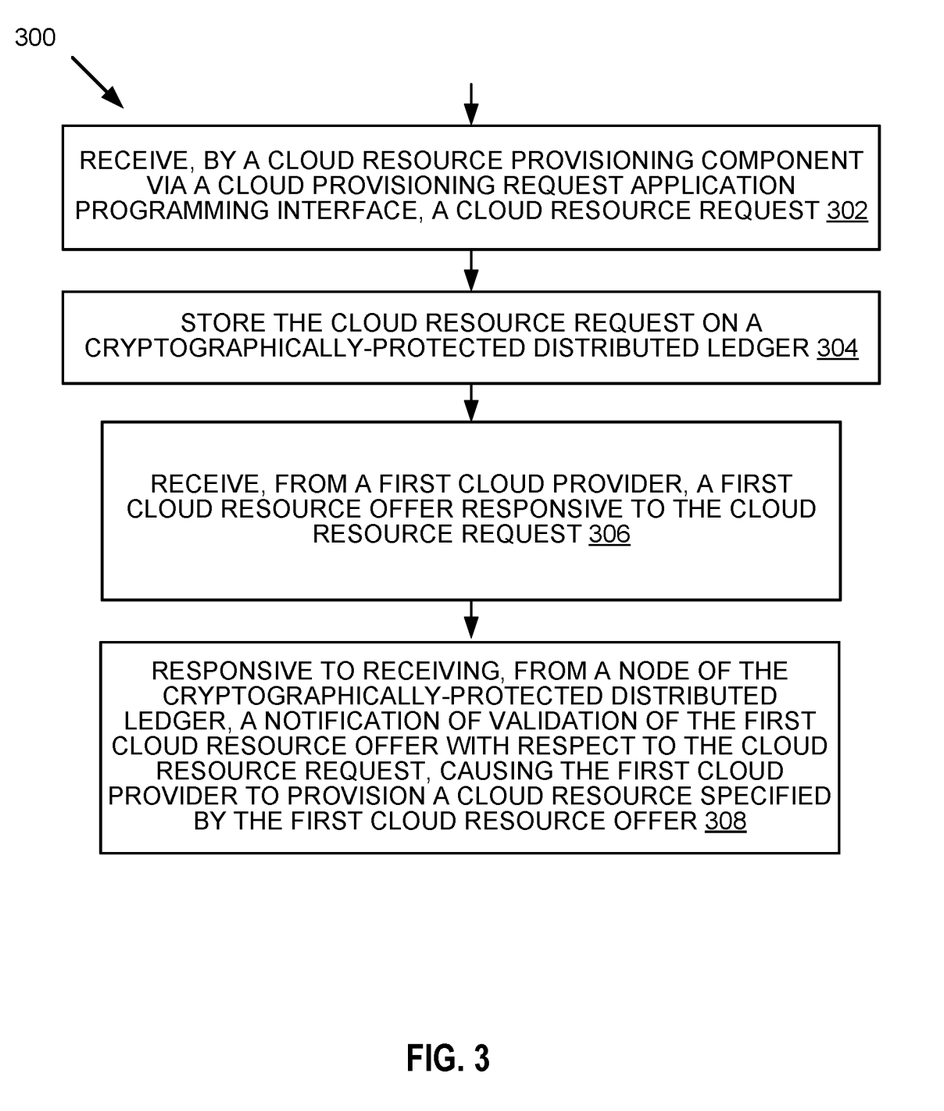
FIG. 3 depicts a flow diagram illustrating an example method of managing cloud acquisitions using distributed ledgers in accordance with some implementations of the present disclosure.

FIG. 3 is a flow diagram illustrating an example method 300 for managing cloud acquisitions using distributed ledgers in accordance with one or more aspects of the present disclosure. Method 300 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, in one embodiment, method 300 begins at block 302, where a cloud resource provisioning component (e.g., the cloud resource provisioning component 151 of FIG. 1) receives a cloud resource request initiated by a cloud client. In some embodiments, the cloud resource provisioning component can receive the cloud resource request from a cloud client via a cloud provisioning request application programming interface (API) (e.g., the cloud provisioning request API 150 of FIG. 1). The request can be initiated via a user device (e.g., the user devices 110 and/or 115 of FIG. 1).

At block 304, the cloud resource provisioning component stores the cloud resource request on a distributed ledger (e.g., the distributed ledger 200 of FIG. 2). In some embodiments, storing the cloud resource request on the distributed ledger can include the cloud resource provisioning component building a transaction and broadcasting the transaction over a network (e.g., the network 101 of FIG. 1). The transaction data broadcasted can be, for example, an identifier of the cloud client that has initiated the request, a timestamp associated with the request, and one or more parameters of the computer resource(s) requested in the cloud resource request. The one or more parameters can include a set of technical parameters, such as computing parameters, storage parameters, networking parameters, etc. In some embodiments, the one or more parameters can include a set of compliance parameters. In some embodiments, the one or more parameters can include a set of regulatory parameters. In some embodiments, the one or more parameters can include one or more pricing parameters. The transaction data can further include a transaction number associated with the transaction. In some embodiments, storing the request can include building and broadcasting a transaction that includes a smart contract code. The smart contract code can be generated by a cloud management system (e.g., the cloud management system 140 of FIG. 1). The smart contract code can be a computer program containing a set of rules under which to match offers from cloud providers to the cloud resource request from the cloud client (i.e., the set of rules specified in the smart contract can be used to validate cloud resource offers received in response to the cloud resource request).

At block 306, the cloud resource provisioning component receives one or more cloud resource offers from one or more cloud providers. The cloud resource provisioning component can receive the one or more cloud resource offers in response to transmitting the cloud resource request to the one or more cloud providers (e.g., via a secured communication channel via the network 101 of FIG. 1). Each cloud resource offer can include one or more cloud resource parameters, e.g., computing, storage, networking, compliance, regulatory, legal, pricing, etc. The cloud resource provisioning component can broadcast a transaction reflecting the cloud resource offer over the network. The transaction data can include the cloud resource offer, including identification of the cloud provider and the one or more cloud resource parameters.

In some implementations, the smart contract code associated with the request can be used to implement validation of the cloud resource offer received from the cloud provider. The cloud management system can generate the smart contract based, e.g., on the parameters specified by the cloud resource request and/or additional parameters, such as client-specific requirements. Generating the smart contract can include filling in the parameter values to a contract template. The contract template can be selected by the cloud management system based on the parameters specified by the cloud resource request and/or client specific requirements. Validating the cloud resource offer can include comparing a cloud resource parameter specified by the request to a cloud resource parameter specified by the cloud resource offer. For example, the smart contract can compare the computing parameter specified by the request to the computing parameter specified by the cloud resource offer. If the computing parameter specified by the cloud resource offer is greater than or equal to the computing parameter specified by the request, the blockchain client can validate the cloud resource offer. If the computing parameter specified by the cloud resource offer is less than the computing parameter specified by the request, the smart contract can reject the cloud resource offer. In some embodiments, validating the cloud resource offer can include the smart contract selecting, among multiple qualified cloud resource offers (e.g., cloud resource offers that satisfy one or more cloud resource parameters specified by the request), a cloud resource that specifies a minimal pricing (e.g., the cloud resource offer specifying the lowest price). In some embodiments, validating the cloud resource offer can include the smart contract accepting an electronic signature of the one or more parties from which the request was received. In some embodiments, validating the cloud resource offer can include the smart contract rejecting a cloud resource offer that was received upon the expiration of a predefined period of time. The predefined period of time can be triggered by the request. In some embodiments, validating the cloud resource offer can include the smart contract selecting two or more cloud resource offers that satisfy the cloud resource parameters specified by the request.

At block 308, the cloud resource provisioning component receives, from the smart contract that is being executed on the blockchain client of the distributed ledger (i.e., a node of the distributed ledger), a notification (e.g., message) that reflects the validation result of the one or more cloud resource offers in response to the cloud resource request. In some implementations, receiving the notification can include the cloud resource provisioning component listening for blocks being broadcasted over the network. In some implementations, the cloud resource provisioning component can listen for a block storing transaction data relating to the validation of the cloud resource offer. Responsive to listening for the block storing transaction data, the cloud resource provisioning component can cause the cloud provider that sent the validated cloud resource offer to provision one or more cloud resources as specified by the cloud resource offer. In some implementations, the cloud resource provisioning component can identify the cloud provider based on the identification of the cloud provider as stored in the transaction data. In some implementations, the cloud resource provisioning component can create a message to transmit to the cloud provider. The message can include the validation/selection of the cloud provider and details regarding the request (e.g., the specified cloud resource parameters). The message can be transmitted over a secured communication channel from the cloud resource provisioning component to the cloud provider. The secured communication channel can be a VPN channel, an SSH channel, a TLS channel, or any similar secured communication channel. Upon receiving the message, the cloud provider can provision one or more cloud resources based on cloud resource offer to the cloud client via the one or more user devices from which the request was initiated (e.g., a customer).

In some implementations, the cloud resource provisioning component can build another transaction reflecting the provisioning data from the cloud provider and broadcast the transaction (i.e., data including the provisioning data) over the network.

Figure 4:
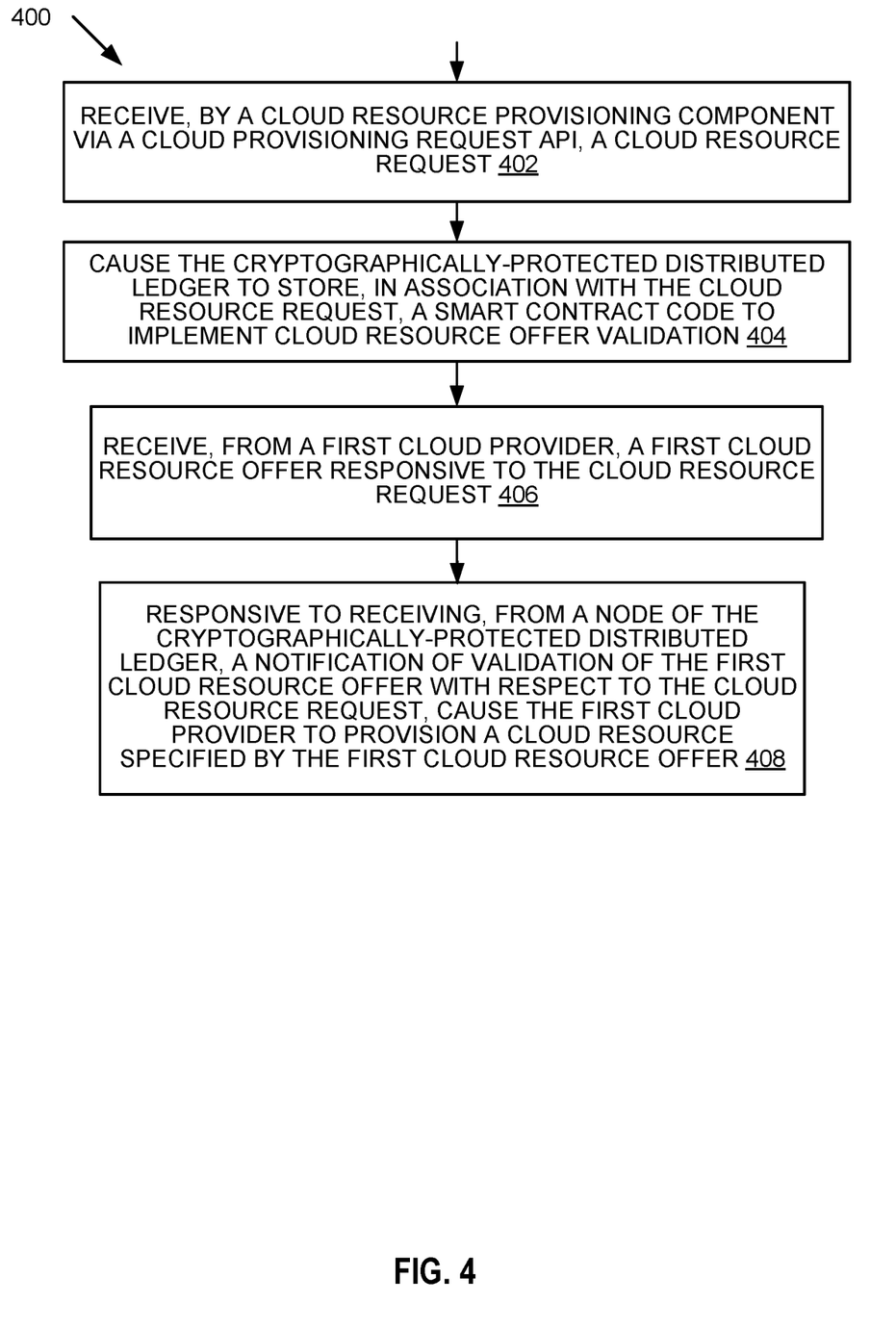
FIG. 4 depicts a flow diagram illustrating an example method of managing cloud acquisitions using distributed ledgers in accordance with some implementations of the present disclosure.

FIG. 4 is a flow diagram illustrating an example method 400 for managing cloud acquisitions using distributed ledgers in accordance with one or more aspects of the present disclosure. Method 400 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 4, in one embodiment, method 400 begins at block 402, where a cloud resource provisioning component (e.g., the cloud resource provisioning component 151 of FIG. 1) receives a cloud resource request initiated by a cloud client. In some embodiments, the cloud resource provisioning component can receive the cloud resource request via a cloud provisioning request application programming interface (API) (e.g., the cloud provisioning request API 150 of FIG. 1). The cloud resource request can be initiated via a user device (e.g., the user devices 110 and/or 115 of FIG. 1).

At block 404, the cloud resource provisioning component causes a distributed ledger (e.g., the distributed ledger 200 of FIG. 2) to store a smart contract code to implement validation of one or more cloud resource offers received from one or more cloud providers in response to the cloud resource request. In some embodiments, a cloud management system (e.g., the cloud management system 140 of FIG. 1) can generate the smart contract based, e.g., on parameters specified by the cloud resource request and/or additional parameters, such as client-specific requirements. Generating the smart contract can include filling in the parameter values to a contract template. The contract template can be selected by the cloud management system based on the parameters specified by the cloud resource request and/or client-specific requirements. The smart contract code can be a computer program containing a set of rules under which to match offers from the one or more cloud providers to the cloud resource request received from the cloud client. In some embodiments, causing the distributed ledger the store the smart contract code includes storing the request on the distributed ledger. Storing the request can include the cloud resource provisioning component building a transaction to be broadcasted over a network (e.g., the network 101 of FIG. 1) to the distributed ledger. The transaction data can include, for example, an identifier of the cloud client that has initiated the request, a timestamp associated with the request, and one or more parameters of the computer resource(s) requested in the cloud resource request. In some embodiments, the one or more parameters can include a set of technical parameters, such as computing parameters, storage parameters, networking parameters, etc. In some embodiments, the one or more parameters can include a set of regulatory parameters. In some embodiments, the one or more parameters can include a set of compliance parameters. In some embodiments, the one or more parameters can include one or more pricing parameters. In some embodiments, storing the request can include building and broadcasting a transaction that includes the smart contract code.

At block 406, the cloud resource provisioning component receives one or more cloud resource offers from one or more cloud providers. The cloud resource provisioning component can receive the one or more cloud resource offers in response to transmitting the cloud resource request to the one or more cloud providers (e.g., via a secured communication channel via the network 101 of FIG. 1). Each cloud resource offer can include one or more cloud resource parameters, e.g., computing, storage, networking, compliance, regulatory, legal, pricing, etc. The cloud resource provisioning component can broadcast cloud resource offer via the same transaction used to broadcast the cloud resource request and the smart contract code. The transaction data can include the cloud resource offer, including identification of the cloud provider and the one or more cloud resource parameters.

In response to broadcasting the one or more cloud resource offers, the smart contract can validate the one or more cloud resource offers. The smart contract can be executed via a blockchain client on the distributed ledger. Validating the cloud resource offer can include comparing a cloud resource parameter specified by the request to a cloud resource parameter specified by a cloud resource offer. For example, the smart contract can compare the computing parameter specified by the request to the computing parameter specified by the cloud resource offer. If the computing parameter specified by the cloud resource offer is greater than or equal to the computing parameter specified by the request, the blockchain client can validate the cloud resource offer. If the computing parameter specified by the cloud resource offer is less than the computing parameter specified by the request, the smart contract can reject the cloud resource offer. In some embodiments, validating the cloud resource offer can include the smart contract selecting, among multiple qualified cloud resource offers (e.g., cloud resource offers that satisfy one or more cloud resource parameters specified by the request), a cloud resource that specifies a minimal pricing (e.g., the cloud resource offer specifying the lowest price). In some embodiments, validating the cloud resource offer can include the smart contract accepting an electronic signature of the one or more parties from which the request was received. In some embodiments, validating the cloud resource offer can include the smart contract rejecting a cloud resource offer that was received upon the expiration of a predefined period of time. The predefined period of time can be triggered by the request. In some embodiments, validating the cloud resource offer can include the smart contract selecting two or more cloud resource offers that satisfy the cloud resource parameters specified by the request.

At block 408, the cloud resource provisioning component receives, from the blockchain client of the distributed ledger (i.e., a node of the distributed ledger), a notification of validation of the cloud resource offer. In some implementations, receiving the notification can include the cloud resource provisioning component listening for blocks being broadcasted over the network. In some implementations, the cloud resource provisioning component can listen for a block storing transaction data relating to the validation of the cloud resource offer. Responsive to listening for the block storing transaction data, the cloud resource provisioning component can cause the cloud provider that sent the validated cloud resource offer to provision one or more cloud resources as specified by the cloud resource offer. In some implementations, the cloud resource provisioning component can identify the cloud provider based on the identification of the cloud provider as stored in the transaction data. In some implementations, the cloud resource provisioning component can create a message to transmit to the cloud provider. The message can include the validation/selection of the cloud provider and details regarding the request (e.g., the specified cloud resource parameters). The message can be transmitted over a secured communication channel from the cloud resource provisioning component to the cloud provider. The secured communication channel can be a VPN channel, an SSH channel, a TLS channel, or any similar secured communication channel. Upon receiving the message, the cloud provider can provision one or more cloud resources based on cloud resource offer to the one or more parties from which the request was received (e.g., the customer).

In some implementations, the cloud resource provisioning component can build another transaction reflecting the provisioning data from the cloud provider and broadcast the transaction (i.e., data including the provisioning data) over the network.

Figure 5:
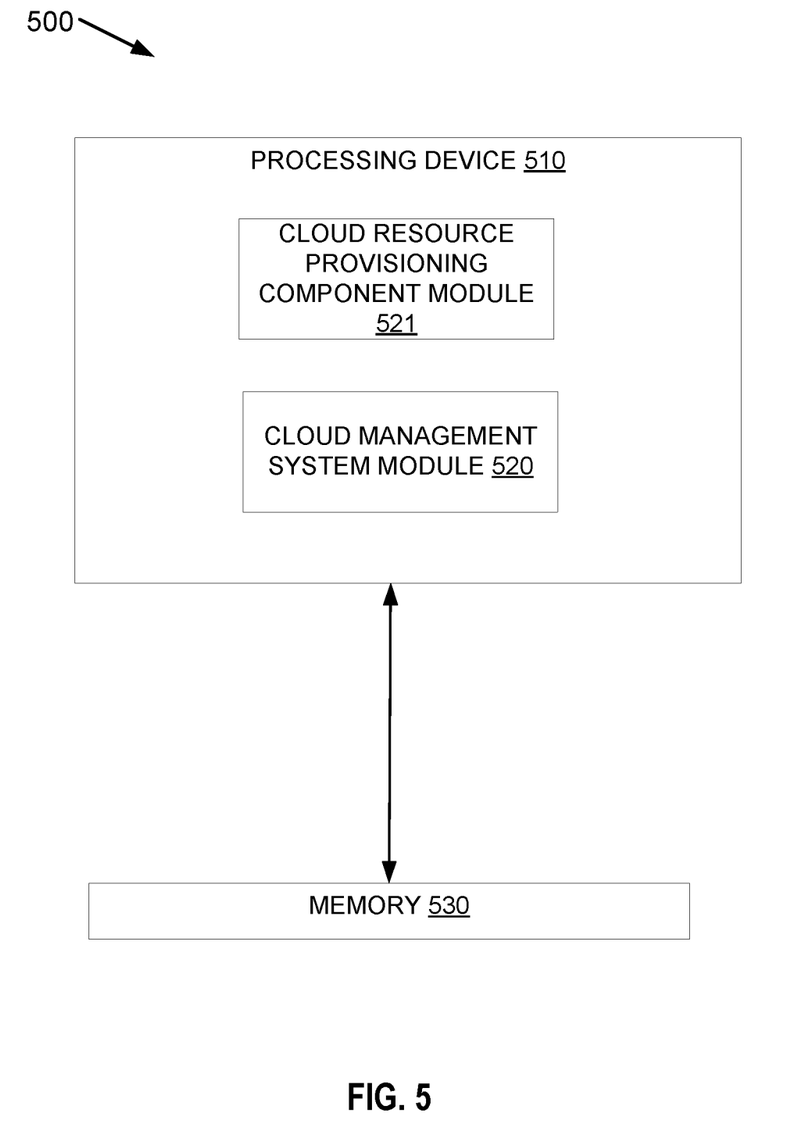
FIG. 5 depicts a block diagram example of a computer system operating in accordance with one or more aspects of the present disclosure.

FIG. 5 is a block diagram example of a computer system 500 operating in accordance with one or more aspects of the present disclosure. Computer system 500 may be the same or similar to the distributed ledger 120 of FIG. 1 and may include one or more processing devices and one or more memory devices. In the example shown, computer system 500 may include a cloud management system module 520 and a cloud resource provisioning component module 521. Alternatively, the functionality of cloud resource provisioning component module 521 may be divided into multiple sub-modules.

Cloud resource provisioning component module 521 is responsible for receiving a cloud resource request from a cloud client via a cloud provisioning request API via one or more user devices (e.g., the user devices 110, 115 of FIG. 1). The cloud resource provisioning component module 521 is further responsible for building and sending (i.e., broadcasting) transactions over a network (e.g., the network 101 of FIG. 1). The cloud resource provisioning component module 521 is further responsible for listening to the network for broadcasts, such as broadcasts of transactions from a blockchain client (e.g., the blockchain clients 160, 165) of a distributed ledger (e.g., the distributed ledger 120). The cloud resource provisioning component module 521 is further responsible for receiving offers from one or more cloud providers in response to the request. The cloud resource provisioning component module 521 is further responsible for causing a cloud provider to provision resources based on an offer to the one or more parties. Cloud management system module 520 is responsible for generating a smart contract code to be stored on a distributed ledger (e.g., the distributed ledger 200 of FIG. 2). Further details with regard to the cloud resource provisioning component module 521 and cloud management system module 520 is described herein above with reference to FIGS. 3-4.

Figure 6:
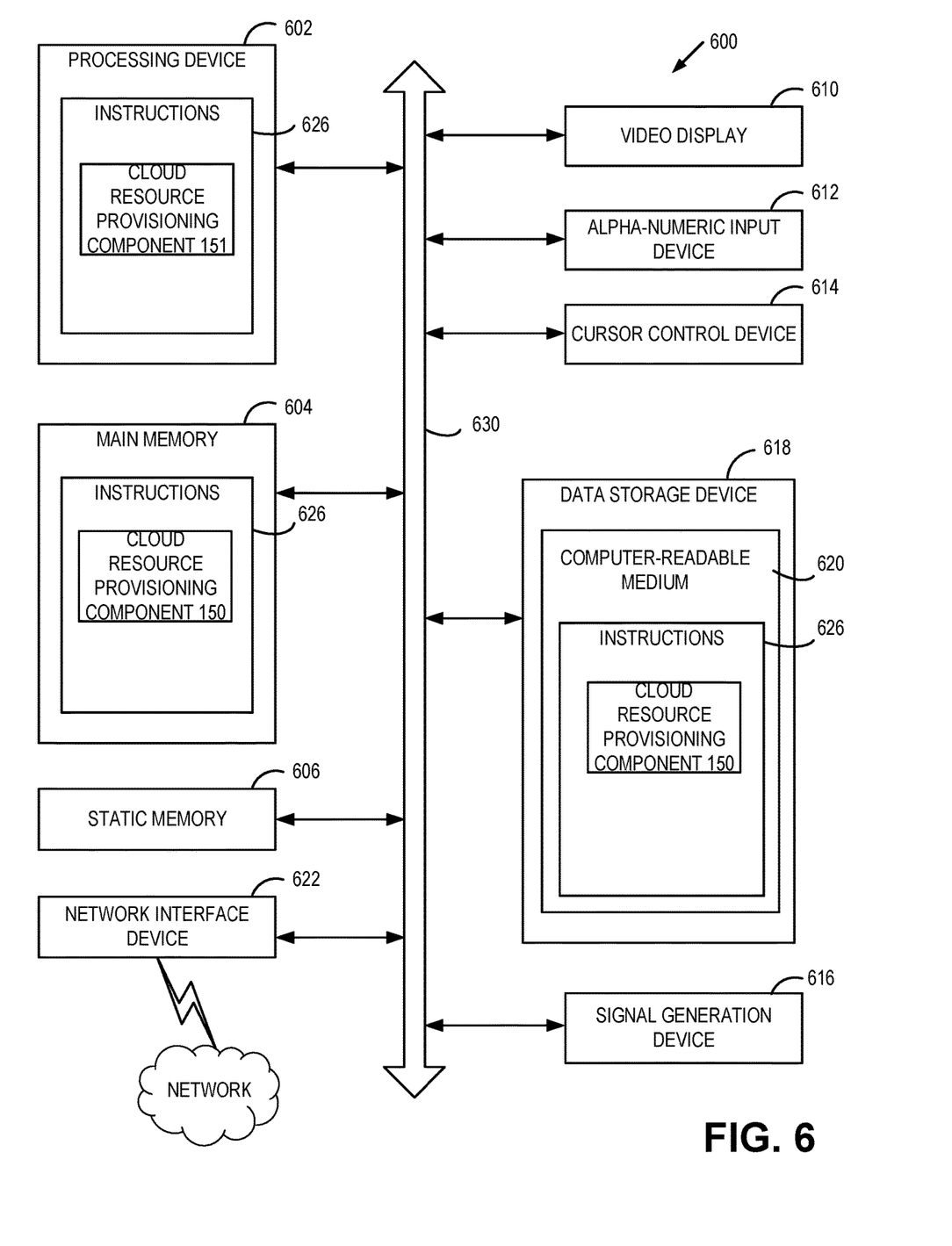
FIG. 6 depicts a block diagram that illustrates one implementation of a computer system in accordance with one or more aspects of the present disclosure.

FIG. 6 is a diagrammatic representation of a machine in the exemplary form of a computer system 600 within which a set of instructions for causing the machine to perform any one or more of the methodologies discussed herein may be executed. In various illustrative examples, computer system 600 may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 600 may include a processing device 602, a main memory 604 (e.g., read-only memory (ROM), flash memory, dynamic random access memory (DRAM) (such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 602 may also be one or more special-purpose processing devices such as an application specific integrated circuit (ASIC), a field programmable gate array (FPGA), a digital signal processor (DSP), network processor, or the like. Processing device 602 may be configured to execute the cloud resource provisioning component 151 of FIG. 1 for programming the operations and steps discussed herein.

Computer system 600 may further include a network interface device 608. Computer system 600 may also include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (e.g., instructions executed by the cloud resource provisioning component 151) for the computer system 600 embodying any one or more of the methodologies of functions described herein. The instructions 626 for the computer system 600 may also reside, completely or at least partially, within main memory 604 and/or within processing device 602 during execution thereof by computer system 600; main memory 604 and processing device 602 also constituting machine-readable storage media. The instructions 626 may further be transmitted or received over a network 626 via network interface device 608.

Machine-readable storage medium 620 may also be used to store the device queue manner logic persistently. While machine readable storage medium 620 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200 and/or method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    transmitting, to one or more cloud providers, a cloud resource request to provision a cloud resource for a client;
    broadcasting, to a distributed ledger, a first transaction comprising the cloud resource request responsive to transmitting the cloud resource request;
    receiving, from a first cloud provider of the one or more cloud providers, first cloud resource parameters responsive to broadcasting the first transaction;
    broadcasting, to the distributed ledger, a second transaction comprising the first cloud resource parameters;
    receiving, from a blockchain client of the distributed ledger, a notification of smart contract-based validation of the first cloud resource parameters;
    responsive to receiving the notification, transmitting, by a processing device, a message to the first cloud provider that causes the first cloud provider to provision a first cloud resource to the client according to the first cloud resource parameters; and
    broadcasting, to the distributed ledger, a third transaction reflecting provisioning of the first cloud resource to the client.

2. The method of claim 1, wherein the first cloud resource parameters comprise at least one of first parameters characterizing compute nodes, second parameters characterizing storage, or third parameters characterizing networking.

3. The method of claim 1, further comprising:
    storing the cloud resource request on the distributed ledger, wherein storing the cloud resource request comprises:
    causing the distributed ledger to store, in association with the cloud resource request, a smart contract code to implement cloud resource parameter validation.

4. The method of claim 1, further comprising:
    storing the cloud resource request on the distributed ledger, wherein storing the cloud resource request comprises:
    causing the distributed ledger to store, in association with the cloud resource request, a smart contract code to implement cloud resource parameter validation by comparing a first cloud resource parameter specified by the cloud resource request to a second cloud resource parameter specified by the first cloud resource parameters.

5. The method of claim 1, further comprising:
    storing the cloud resource request on the distributed ledger, wherein storing the cloud resource request comprises:
    causing the distributed ledger to store, in association with the cloud resource request, a smart contract code to implement cloud resource parameter validation, wherein the smart contract code is to select, among two or more qualified cloud resource parameters, a cloud resource parameter that specifies a minimal cloud resource parameter.

6. The method of claim 1, further comprising:
    storing the cloud resource request on the distributed ledger, wherein storing the cloud resource request comprises:
    causing the distributed ledger to store, in association with the cloud resource request, a smart contract code to implement cloud resource parameter validation by accepting an electronic signature of an originator of the cloud resource request.

7. The method of claim 1, further comprising:
    storing the cloud resource request on the distributed ledger, wherein storing the cloud resource request comprises:
    causing the distributed ledger to store, in association with the cloud resource request, a smart contract code to implement cloud resource parameter validation by rejecting second cloud resource parameters that were received upon expiration of a predefined timeout triggered by the cloud resource request.

8. A system comprising:
a memory; and
a processing device, operatively coupled to the memory, to:
    transmit, to one or more cloud providers, a cloud resource request to provision a cloud resource for a client;
    broadcast, to a distributed ledger, a first transaction comprising the cloud resource request responsive to the transmission of the cloud resource request;
    receive, from a first cloud provider of the one or more cloud providers, first cloud resource parameters responsive to the broadcast of the first transaction;
    broadcast, to the distributed ledger, a second transaction comprising the first cloud resource parameters;
    receive, from a blockchain client of the distributed ledger, a notification of smart contract-based validation of the first cloud resource parameters;
    responsive to the reception of the notification, transmit a message to the first cloud provider that causes the first cloud provider to provision a first cloud resource to the client according to the first cloud resource parameters; and
    broadcast, to the distributed ledger, a third transaction reflecting provisioning of the first cloud resource to the client.

9. The system of claim 8, wherein the first cloud resource parameters comprise at least one of first parameters characterizing compute nodes, second parameters characterizing storage, or third parameters characterizing networking.

10. The system of claim 8, wherein the processing device is further to:
    store the cloud resource request on the distributed ledger, wherein to store the cloud resource request, the processing device is to:
        cause the distributed ledger to store, in association with the cloud resource request, a smart contract code to implement cloud resource parameter validation.

11. The system of claim 8, wherein the processing device is further to:
    store the cloud resource request on the distributed ledger, wherein to store the cloud resource request, the processing device is to:
        cause the distributed ledger to store, in association with the cloud resource request, a smart contract code to implement cloud resource parameter validation by comparing a first cloud resource parameter specified by the cloud resource request to a second cloud resource parameter specified by the first cloud resource parameters.

12. The system of claim 8, wherein the processing device is further to:
    store the cloud resource request on the distributed ledger, wherein to store the cloud resource request, the processing device is to:
        cause the distributed ledger to store, in association with the cloud resource request, a smart contract code to implement cloud resource parameter validation, wherein the smart contract code is to select, among two or more qualified cloud resource parameters, a cloud resource parameter that specifies a minimal cloud resource parameter.

13. The system of claim 8, wherein the processing device is further to:
    store the cloud resource request on the distributed ledger, wherein to store the cloud resource request, the processing device is to:
        cause the distributed ledger to store, in association with the cloud resource request, a smart contract code to implement cloud resource parameter validation by accepting an electronic signature of an originator of the cloud resource request.

14. The system of claim 8, wherein the processing device is further to:
    store the cloud resource request on the distributed ledger, wherein to store the cloud resource request, the processing device is to:
        cause the distributed ledger to store, in association with the cloud resource request, a smart contract code to implement cloud resource parameter validation by rejecting second cloud resource parameters that were received upon expiration of a predefined timeout triggered by the cloud resource request.

15. A non-transitory computer-readable storage medium comprising instructions that, when executed by a processing device, cause the processing device to:
    transmit, to one or more cloud providers, a cloud resource request to provision a cloud resource for a client;
    broadcast, to a distributed ledger, a first transaction comprising the cloud resource request responsive to the transmission of the cloud resource request;
    receive, from a first cloud provider of the one or more cloud providers, first cloud resource parameters responsive to the broadcast of the first transaction;
    broadcast, to the distributed ledger, a second transaction comprising the first cloud resource parameters;
    receive, from a blockchain client of the distributed ledger, a notification of smart contract-based validation of the first cloud resource parameters;
    responsive to the reception of the notification, transmit, by the processing device, a message to the first cloud provider that causes the first cloud provider to provision a first cloud resource to the client according to the first cloud resource parameters; and
    broadcast, to the distributed ledger, a third transaction reflecting provisioning of the first cloud resource to the client.

16. The non-transitory computer-readable storage medium of claim 15, wherein the first cloud resource parameters comprise at least one of first parameters characterizing compute nodes, second parameters characterizing storage, or third parameters characterizing networking.

17. The non-transitory computer-readable storage medium of claim 15, wherein the instructions, when executed by the processing device, further cause the processing device to:
    store the cloud resource request on the distributed ledger, wherein to store the cloud resource request, the instructions, when executed by the processing device, cause the processing device to:
        cause the distributed ledger to store, in association with the cloud resource request, a smart contract code to implement cloud resource parameter validation.

18. The non-transitory computer-readable storage medium of claim 15, wherein the instructions, when executed by the processing device, further cause the processing device to:

store the cloud resource request on the distributed ledger, wherein to store the cloud resource request, instructions, when executed by the processing device, cause the processing device to:

cause the distributed ledger to store, in association with the cloud resource request, a smart contract code to implement cloud resource parameter validation, wherein the smart contract code is to select, among two or more qualified cloud resource parameters, a cloud resource parameter that specifies a minimal cloud resource parameter.

19. The non-transitory computer-readable storage medium of claim 15, wherein the instructions, when executed by the processing device, further cause the processing device to:

store the cloud resource request on the distributed ledger, wherein to store the cloud resource request, the instructions, when executed by the processing device, cause the processing device to:

cause the distributed ledger to store, in association with the cloud resource request, a smart contract code to implement cloud resource parameter validation by accepting an electronic signature of an originator of the cloud resource request.

20. The non-transitory computer-readable storage medium of claim 15, wherein the instructions, when executed by the processing device, further cause the processing device to:

store the cloud resource request on the distributed ledger, wherein to store the cloud resource request, the instructions, when executed by the processing device, cause the processing device to:

cause the distributed ledger to store, in association with the cloud resource request, a smart contract code to implement cloud resource parameter validation by rejecting second cloud resource parameters that were received upon expiration of a predefined timeout triggered by the cloud resource request.

\* \* \* \* \*